(12) United States Patent
Bottrell

(10) Patent No.: US 12,162,384 B2
(45) Date of Patent: Dec. 10, 2024

(54) DOUBLE WALL FOLDING CHAIR AND METHOD FOR USE

(71) Applicant: 2807302 Ontario Inc., Brampton (CA)

(72) Inventor: James Bottrell, Mississauga (CA)

(73) Assignee: 2807302 Ontario Inc., Brampton (CA)

( * ) Notice: Subject to any disclaimer, the term of this patent is extended or adjusted under 35 U.S.C. 154(b) by 323 days.

(21) Appl. No.: 17/579,250

(22) Filed: Jan. 19, 2022

(65) Prior Publication Data

US 2022/0227265 A1 Jul. 21, 2022

Related U.S. Application Data

(60) Provisional application No. 63/139,347, filed on Jan. 20, 2021.

(51) Int. Cl.
*B60N 2/20* (2006.01)
*B60N 2/005* (2006.01)

(52) U.S. Cl.
CPC .............. *B60N 2/206* (2013.01); *B60N 2/005* (2013.01)

(58) Field of Classification Search
CPC ...... B60N 2/206; B60N 2/005; B60N 2/3095; B60N 2/3011; B60N 2/686
See application file for complete search history.

(56) References Cited

U.S. PATENT DOCUMENTS

| | | | | |
|---|---|---|---|---|
| 5,820,221 A * | 10/1998 | Greaves | ............ | A47C 4/04 297/440.22 |
| 6,808,231 B1 * | 10/2004 | Hill | ............ | B60R 9/06 297/217.7 |
| 8,002,354 B2 * | 8/2011 | Chen | ............ | B60N 2/20 297/440.2 |
| 2006/0284438 A1 * | 12/2006 | Carty | ............ | B60R 9/00 296/37.6 |
| 2008/0246298 A1 * | 10/2008 | Leigh-Monstevens | | B60N 2/015 296/64 |
| 2013/0257121 A1 | 10/2013 | Otta | | |
| 2015/0239372 A1 * | 8/2015 | Bauer | ............ | B60J 5/108 296/57.1 |

* cited by examiner

*Primary Examiner* — Mark R Wendell
(74) *Attorney, Agent, or Firm* — Cherskov Flaynik & Gurda, LLC

(57) ABSTRACT

A folding chair is described. It includes a double-wall single mold chair seat, a double-walled chair back, and a hinge that joins the seat and the back. As a result, the seat and the back can open and close relative to each other. A method for use includes detaching the folding chair from a support frame and folding the chair back against the seat to form a flat folded configuration.

20 Claims, 13 Drawing Sheets

DOUBLE WALL FOLDING CHAIR AND METHOD FOR USE

This non-provisional patent application claims priority to U.S. provisional application 63/139,347, filed on Jan. 20, 2021, the contents of which are incorporated by reference.

TECHNICAL FIELD

The present disclosure generally relates to a folding chair and more specifically, to a double wall folding chair and a method for using the chair.

BACKGROUND

Seats in the North American market today are made from a single-ply injection mold. This technology provides seats that lack design and comfort unless padding is added. The prior art also does not provide the ability for features built into the seats. The design of folding chairs made from a single-ply injection mold is also bulky and doesn't fold flat. Thus, there is a need for a flat-folding chair that is easy to produce, provides comfort without additional pieces, and allows for design features built into the seats.

SUMMARY

The present disclosure describes a double-ply molded folding chair that is comfortable and provides for built-in design features.

In a first aspect of the present invention, there is provided a folding chair including a double wall single mold seat, a double wall single mold back, and a hinge joining the seat and the back to allow the seat and the back to open and close relative to each other.

In a further aspect of the present invention, there is provided a method for using a folded chair, including detaching the folding chair, which includes a double wall single mold chair seat and a double wall single mold chair back, from a support frame and folding the chair back against the chair seat to form a flat folded configuration.

A more complete understanding of the disclosure can be obtained by reference to the following detailed description in connection with the attached drawings.

The drawings provided herein are presented for convenience to explain the functions of the elements included in the described embodiments of the folding chair. Elements and details that are obvious to a person skilled in the art may not have been illustrated. Conceptual sketches have been used to illustrate elements that would be readily understood in the light of the present disclosure. Some details have been exaggerated for clarity. These drawings are not fabrication drawings and should not be scaled.

DETAILED DESCRIPTION

The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The following description refers to a folding chair. It will be understood by those skilled in the art that the disclosure provided may be applied to a double wall blow molded chair that can fold flat. The folding chair nay be reversibly attached to structures, such as a frame-mounted to the ground, a table frame, a boat deck, or a trailer hitch frame. The folding chair provides a comfortable chair that can fold flat for storage and can included additional features molded into the chair for comfort and ease of use.

Figure 1:
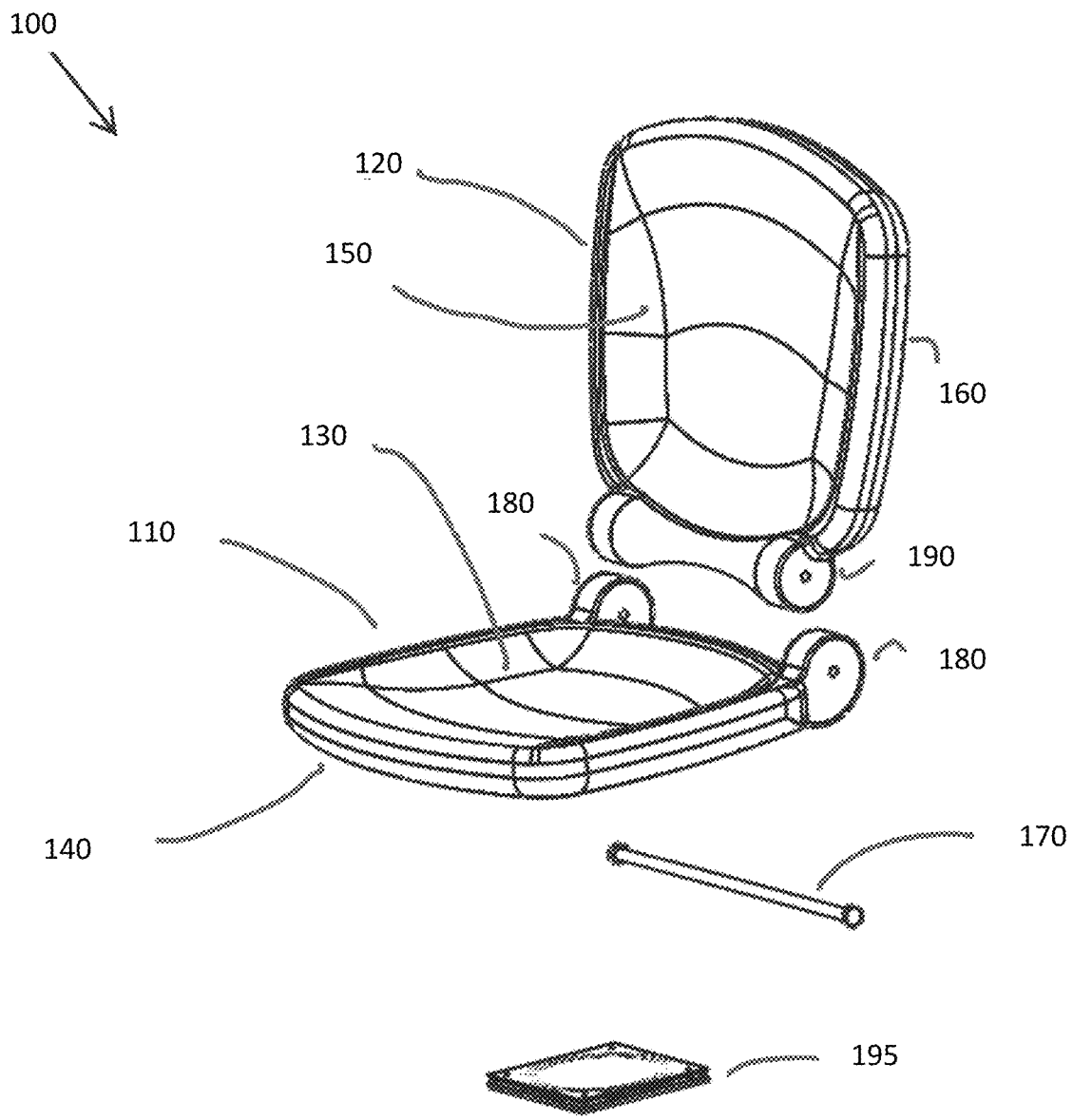
FIG. 1 is a perspective exploded view of an embodiment of a folding chair of the present invention.

An embodiment of the present disclosure is presented in FIG. 1. A folding chair 100 includes a chair seat 110 and a chair back 120. The chair seat 110 is joined to the chair back 120 with a hinge 170, allowing the chair back to fold against the chair seat or to open to a configuration for seating. The chair seat 110 has a seat top layer 130 and a seat bottom layer 140 (not in view in FIG. 1). The seat top layer 130 is continuous with the seat bottom layer 140, so that the seat comprises a single molded piece with double-wall construction. The chair back 120 has a back forward layer 150 and a back rear layer 160 (not in view in FIG. 1). The back forward layer 150 is continuous with the back rear layer 160, thus the chair back 120 comprises a single molded piece with a double-wall construction. The double-wall construction of the chair seat 110 and chair back 120 allows one layer, for example, the seat top layer 130 and back forward layer 150 to be contoured for comfort and the other layer, for example, the seat bottom layer 140 and back rear layer 160, to be non-contoured so that the folding chair is flat when in the folded configuration. The double-wall construction also allows for features such as cup holders to be molded into the chair seat or back. The double-wall single mold construction can be achieved by, for example, blow molding.

As further illustrated in FIG. 1, a hinge 170 joins the seat 110 to the back 120. In one embodiment, a hinge 170 comprises a hinge rod and joins the seat 110 and back 120 through chair seat adaptors 180 and a chair back adaptor 190. The chair seat adaptors 180 and the chair back adaptor 190 may be functional features that are molded into the chair seat 110 and chair back 120, respectively. The hinge 170 may comprise a solid metal hinge to provide a sturdy folding chair 100. In one example, the hinge 170 may be a solid metal rod traversing the chair seat and chair back adaptors 180, 190, thereby joining the chair seat 110 and chair back 120 in a foldable manner. A connector 195 may be attached to the seat bottom layer 140 to allow the folding chair 100 to be attached to other structures, such as a support frame, for example, a frame-mounted to the ground or a deck, a table frame, a boat deck or a trailer hitch frame. An example of a trailer hitch frame that the folding chair may be attached to through the connector 195 is provided in U.S. Patent No. 2013/0257,121. The connector 195 may comprise a plate with bolt holes for attachment of the folding chair 100 to other structures.

The folding chair seat 110 and back 120 may be constructed by blow molding, using materials such as polyethylene plastic.

Figure 2A:
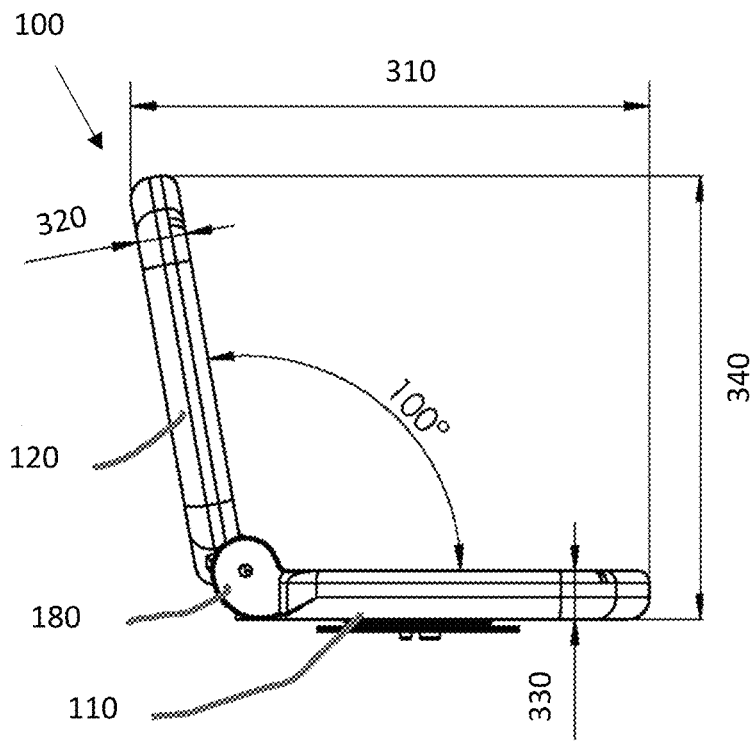
FIG. 2A is a side plan view of the folding chair illustrated in FIG. 1.
Figure 2B:
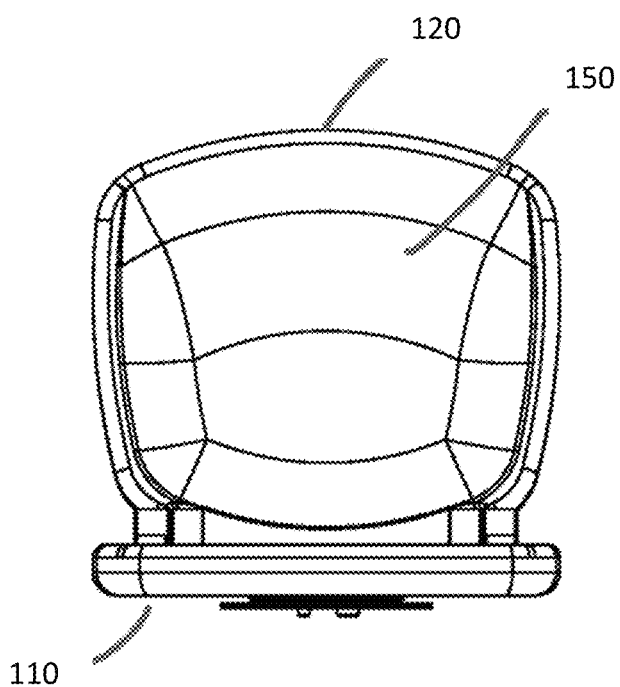
FIG. 2B is a front plan view of the folding chair illustrated in FIG. 1.
Figure 2C:
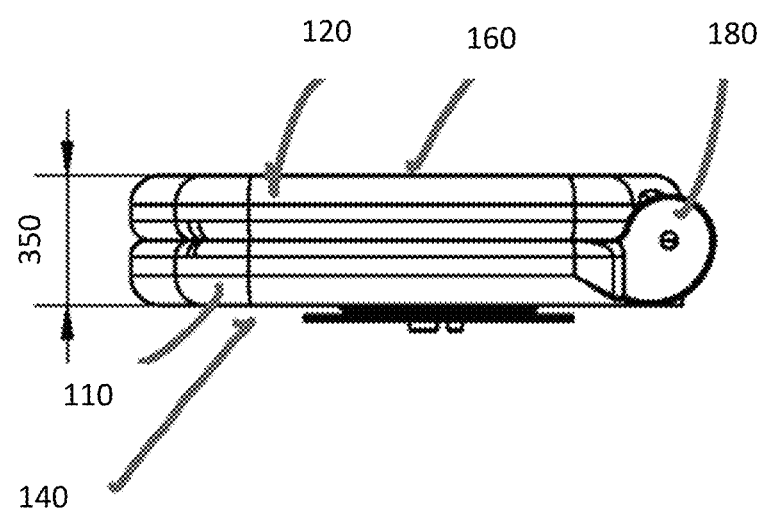
FIG. 2C is a side plan view of the folding chair illustrated in FIG. 1 in a folded configuration.

Referring to FIGS. 2A to 2C, an embodiment of the folding chair 100 in an open and folded configuration is presented. In FIG. 2A, the folding chair 100 is in an open configuration, with, for example, a 100° angle between the chair seat 110 and chair back 120. As further illustrated in FIG. 2B, the open configuration of FIG. 2A of the folding chair 100 is presented in a front view. As illustrated in FIG. 2C, the folding chair 100 is in the folded configuration. The alignment of the chair seat adaptor 180 and chair back adaptor 190 (not visible) provide a flat-folding of the seat 110 and back 120, while the flat surface of the seat bottom layer 140 and back rear layer 160 provide a flat folded chair.

In one embodiment, such as the one shown in FIG. 2A, the thickness 330 of the chair seat 110 is 2 inches, approximately. The thickness 320 of the chair back 120 is likewise 2.00 inches, approximately. The total width 310 of the open chair 100 is 21.31 inches, approximately. The height 340 of the open chair 100 is 18.25 inches, approximately. As shown in FIG. 2C, the thickness 350 of the folded chair is 4 inches, approximately. For the embodiment shown in FIGS. 2A-2C approximate dimensions refer to measurements made feasible using appropriate manufacturing methods.

Figure 3:
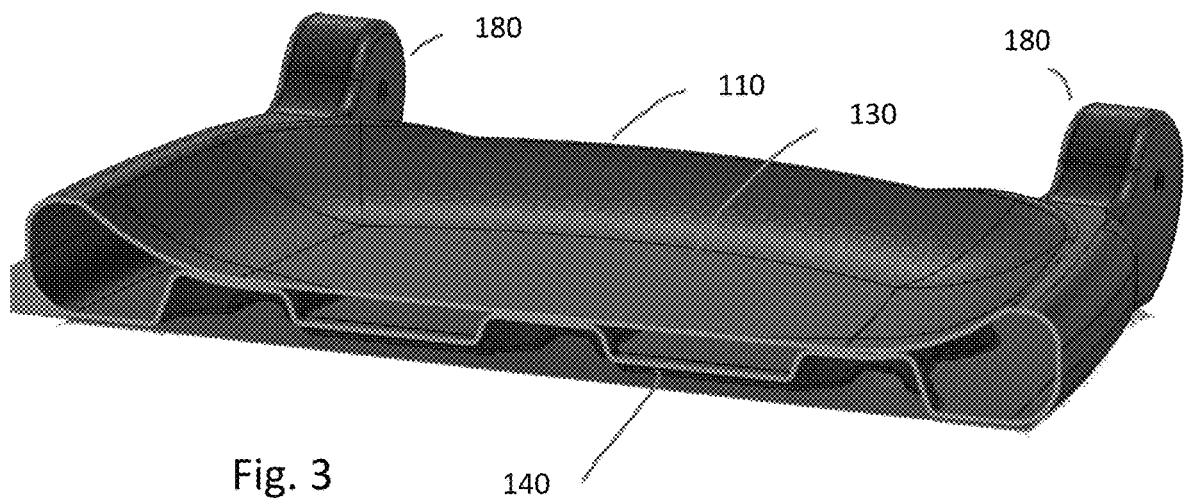
FIG. 3 is a cutaway perspective view of an embodiment of a chair seat of the folding chair.

Referring to FIG. 3, a cutaway view of the folding chair seat 110 is shown. The seat top layer 130 is contoured for comfort when a user is seated on the folding chair 100. The double-wall structure of the chair seat 110 provides cushioning and strength without requiring additional parts, such as an added seat cushion. The overall flat surface of the seat bottom layer 140 provides a flat configuration in the folded configuration of the folding chair 100.

Figure 4:
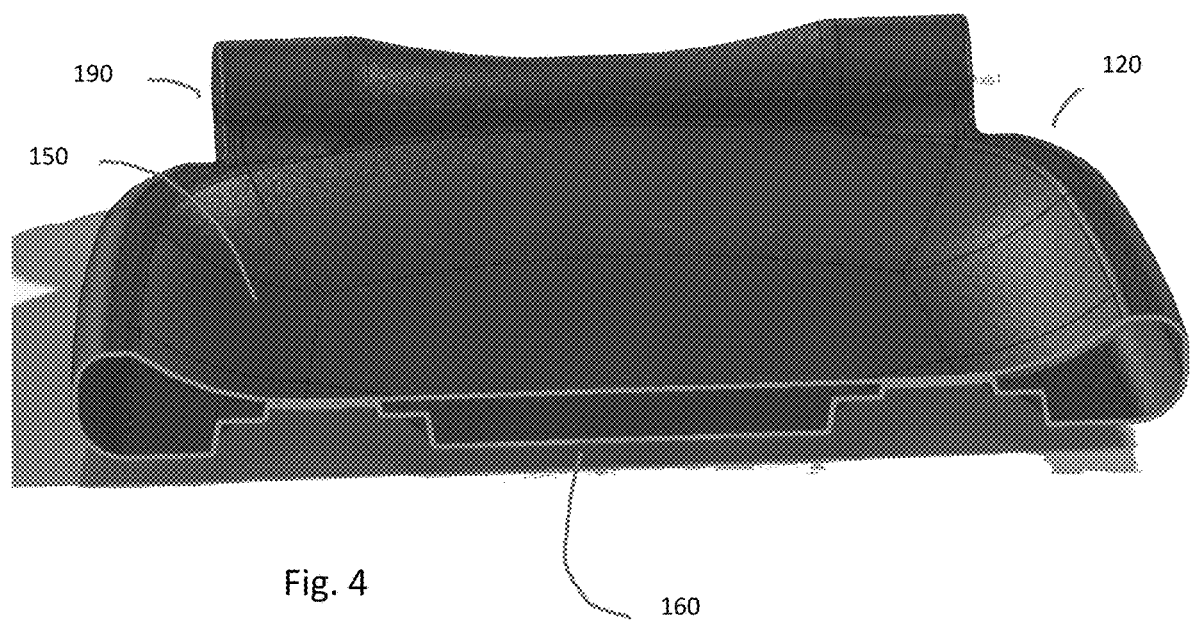
FIG. 4 is a cutaway perspective view of an embodiment of hair back of the folding chair.

Referring to FIG. 4, a cutaway view of the folding chair back 120 is shown. The back forward layer 150 is contoured for comfort when a user is seated on the folding chair 100 and leaning back. The double-wall structure of the chair back 120 provides cushioning and strength without requiring additional parts, such as an added back cushion. The overall flat surface of the back rear layer 160 provides a flat configuration in the folded configuration of the folding chair 100.

Figure 5:
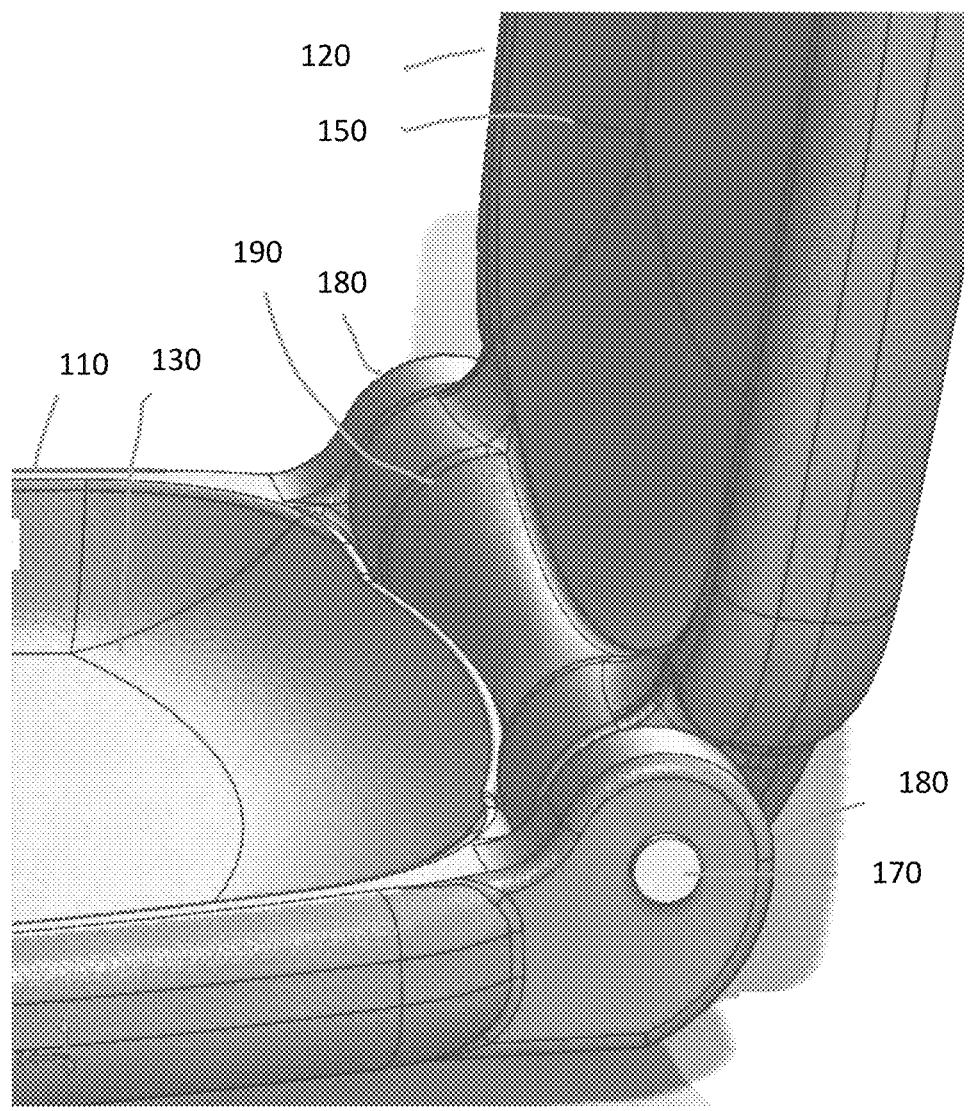
FIG. 5 is a side view of the assembled folding chair illustrated in FIG. 1.
Figure 6:
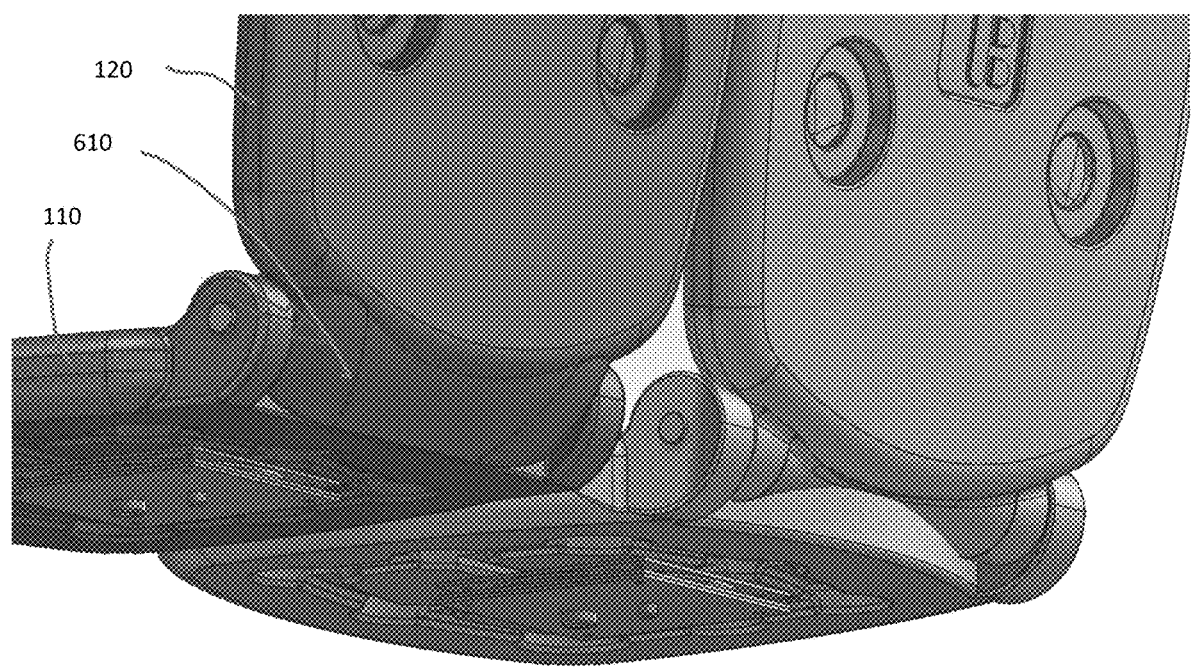
FIG. 6 is a bottom perspective view of an embodiment of the folding chair including a stop on the chair seat.

In one embodiment, as illustrated in FIG. 5, the chair seat 110 and chair back 120 are joined through the hinge 170, which threads through the chair seat adaptors 180 and chair back adaptor 190. The hinge allows the chair back 120 to fold forward and down against the chair seat 110. As further illustrated in FIG. 6, a chair back stop 610 may be provided along the bottom edge of the chair back 120. The chair back stop 610 is shaped to abut a complementary surface on the chair seat 110 when the chair back is in the open configuration and thereby hold the chair back in an open position, thus maintaining the chair back in a position for a user to sit on the folding chair 100. The stop 610 may hold the chair back 120 in an approximately vertical position relative to the chair seat 10 for example, at an approximately 100° angle relative to the chair seat.

Figure 7:
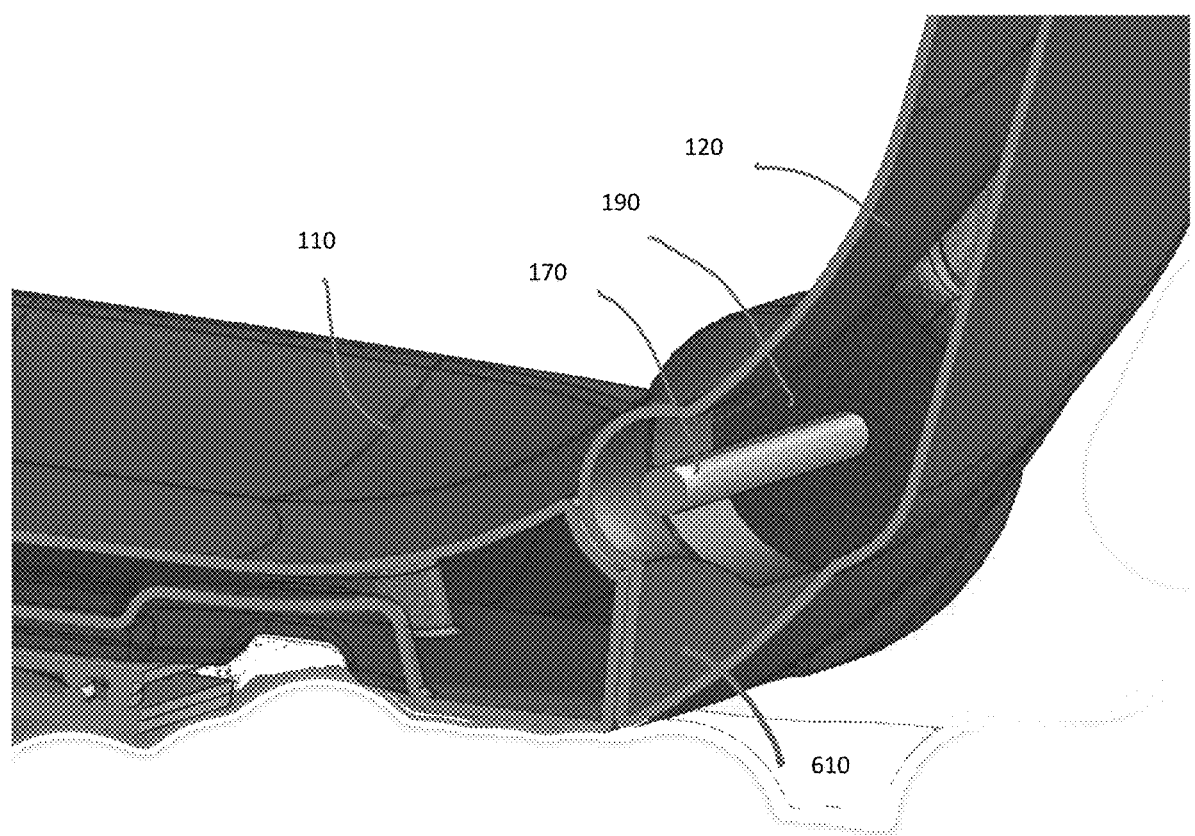
FIG. 7 is a side cutaway view of the folding chair illustrated in FIG. 6.

As further illustrated in FIG. 7, the chair back stop 610 is an extension of the double-wall body of the chair back 120. The hinge 170 traverses through the chair back adaptor 190 and the chair seat adaptors 180 (not clearly visible in FIG. 7), so the chair back 120 can rotate around the hinge into an open configuration of the folding chair 100. The rotation of the chair back 120 to the open position extends to the point when the chair back stop 610 abuts the chair seat 110.

Figure 8:
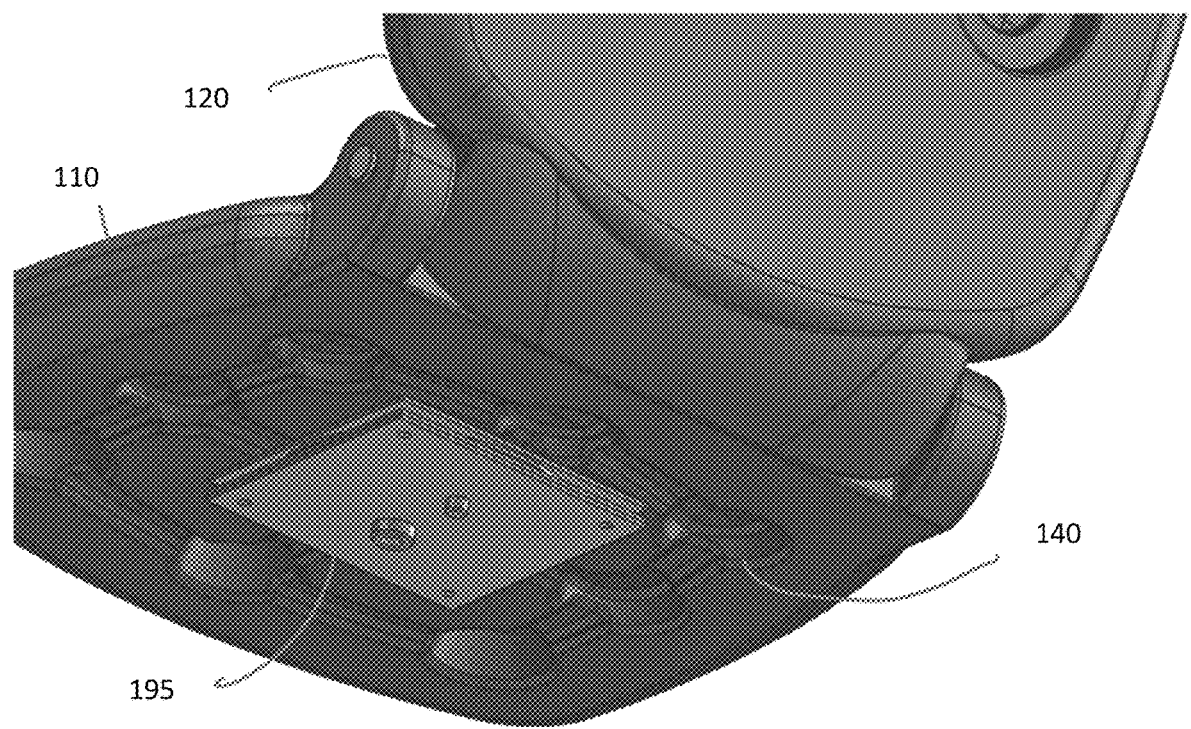
FIG. 8 is a bottom perspective view of an embodiment of the folding chair.
Figure 9:
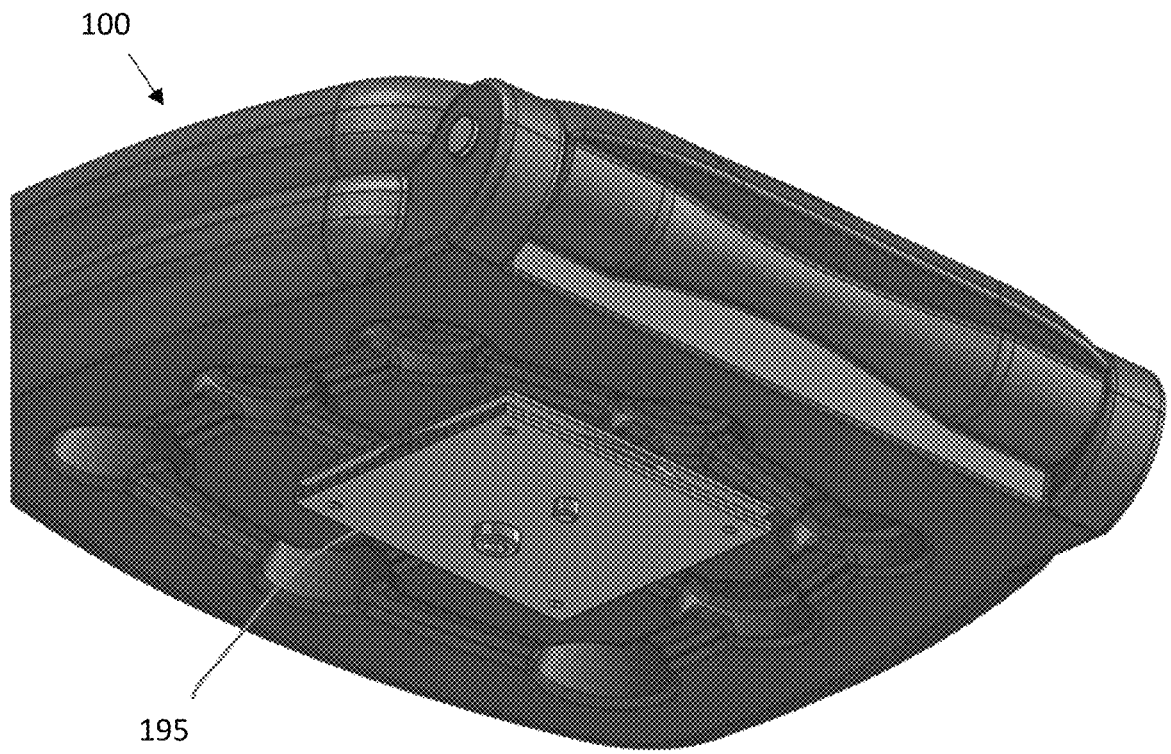
FIG. 9 is a bottom perspective view of the folding chair illustrated in FIG. 8 in a folded configuration.

Referring to FIG. 8, a connector 195, such as a metal plate, may be fixed to the chair seat bottom layer 140. In one embodiment, the connector 195 may be a flat plate or another shape such as a cylinder and may be made of stainless steel for strength and weather resistance. The connector 195 provides a means for attaching the folding chair 100 to another structure, such as a support frame, for example, a support frame fixed to the ground or a deck, a table, a boat deck, or a tailgate seat frame. As further illustrated in FIG. 9, the folding chair 100 can be closed to the folded configuration while still providing access to connector 195 for fixing or removing the chair to other structures.

Figure 10A:
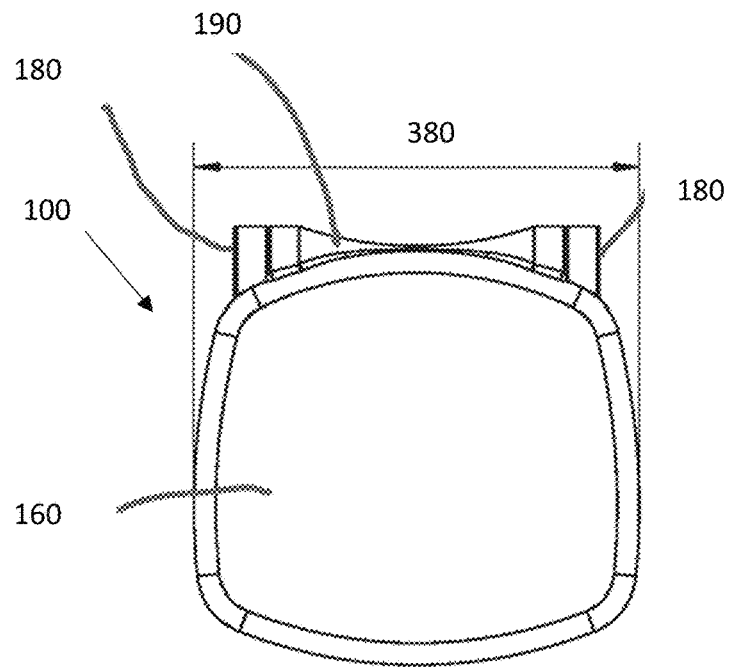
FIG. 10A is a top plan view of an embodiment of the folding chair in the folded configuration.
Figure 10B:
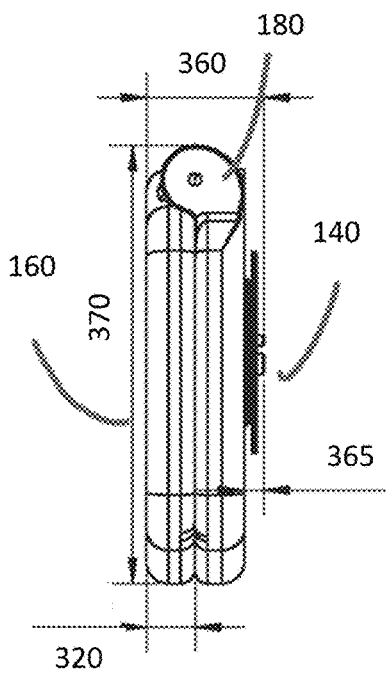
FIG. 10B is a side plan view of the folding chair illustrated in FIG. 10A.
Figure 10C:
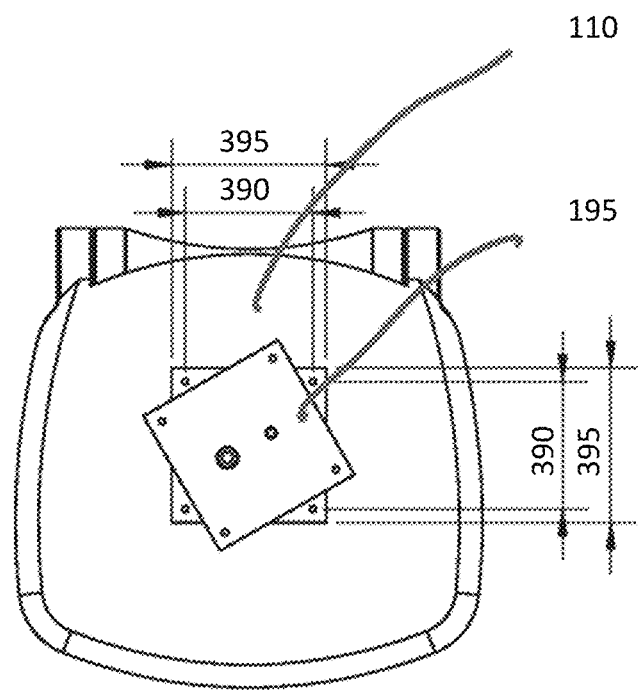
FIG. 10C is a bottom plan view of the folding chair illustrated in FIG. 10A.

Referring to FIGS. 10A-C, an embodiment of the folding chair 100 with a rotatable connector 195 is illustrated in the folded configuration. FIG. 10A illustrates the chair back rear layer 160 with the chair back adaptor 190 extending between the chair seat adaptors 180. FIG. 10B illustrates a side plan view of the chair 100 in the folded configuration, with flat seat bottom layer 140 and flat back rear layer 160. FIG. 10C illustrates the connector 195 as a plate that is rotatable with respect to the chair seat 110, so that if the connector is attached to another structure, the chair 100 can swivel about the structure.

The dimensions of the embodiment shown is FIGS. 10A-C are as follows. The width 380 of the chair back 160 is approximately 18.28 inches. The thickness 360 of the folded chair is approximately 4.8 inches. The depth 370 of the folded chair is approximately 18 inches. The thickness 365 of the connector is approximately 0.8 inches. Turning to FIG. 10C, the distance 390 between the bolt holes is approximately 5 inches. The width 395 of the connector is approximately 6 inches.

Figure 11:
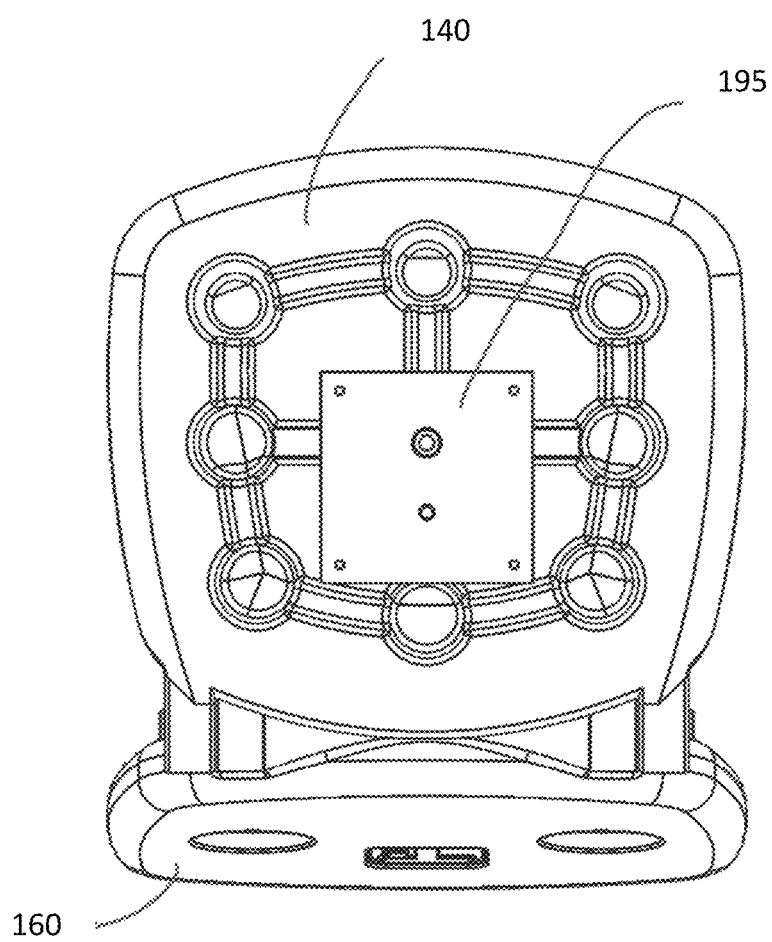
FIG. 11 is a bottom perspective view of an embodiment of the folding chair.

Referring to FIG. 11, the folding chair 100 is illustrated in the open configuration with the connector 195 fixed to the seat 110.

To use the folding chair 100, a user may open the chair back 120 away from the chair seat 110 to the open configuration to allow a user to sit in the chair. For storage, the chair 100 can be closed to the folded configuration. For use in conjunction with a frame, such as a tailgate seat frame, the chair 100 may be attached to the frame using the connector 195 and then opened for sitting. For storage, the chair 100 may be folded Chile still attached to the frame or may be removed from the frame and folded.

While embodiments of the folding chair have been illustrated in the accompanying drawings and described hereinabove, it will be appreciated by those skilled in the art that various modifications, alternate constructions, and equivalents may be employed. It should be further understood that the claims are not intended to be limited to the particular forms disclosed but rather to cover all modifications, equivalents, and alternatives falling within the spirit and scope of this disclosure.

Therefore, the above description and illustrations should not be construed as limiting the scope of the invention, which is defined in the appended claims.

What is claimed is:

1. A folding chair comprising:
   a double wall single mold seat;
   a double wall single mold back having a back forward layer and a back rear layer; and
   a hinge joining the seat and the back, thereby allowing the seat and the back to open and close relative to each other.

2. The folding chair of claim 1, wherein the seat comprises a contoured seat top layer and a flat seat bottom layer.

3. The folding chair of claim 1, wherein the back comprises a contoured back forward layer and a flat back rear layer.

4. The folding chair of claim 1, wherein at least one of the seat and the back comprises a molded functional feature.

5. The folding chair of claim 4, wherein the functional feature comprises a cup holder.

6. The folding chair of claim 4, wherein the functional feature comprises a chair seat adaptor and a chair back adaptor for holding the hinge to join the seat and the back.

7. The folding chair of claim 1, wherein the hinge comprises a hinge rod.

8. The folding chair of claim 1, wherein the hinge comprises a solid metal hinge rod.

9. The folding chair of claim 1, wherein the hinge provides an open configuration between 90 degrees and 130 degrees and a closed flat configuration.

10. The folding chair of claim 1, further comprising a connector for attaching the folding chair to a support frame.

11. The folding chair of claim 1, further comprising a connector for attaching the folding chair to a vehicle tailgate apparatus.

12. The folding chair of claim 4, wherein the functional feature comprises a chair back stop to hold the chair back in an open configuration.

13. The folding chair of claim 1, wherein the seat and the back comprise blow molded plastic.

14. The folding chair of claim 1, wherein the seat and the back are made from polyethylene plastic.

15. The folding chair of claim 1, further comprising a connector attached to the seat bottom.

16. The folding chair of claim 15 wherein said connector comprises a plate with bolt holes for attachment to other structures.

17. The folding chair of claim 1 wherein said chair excludes additional seat cushioning.

18. A method for using a folding chair, comprising:
    detaching the folding chair, including a double wall single mold chair seat and a double wall single mold chair back having a back forward layer and a back rear layer, from a support frame; and
    folding the chair back against the chair seat to form a flat folded configuration.

19. The method for using the folding chair of claim 18, further comprising opening the chair seat from the chair back.

20. The method for using the folding chair of claim 19, further comprising attaching the chair to an external frame.

* * * * *